Figure 2:
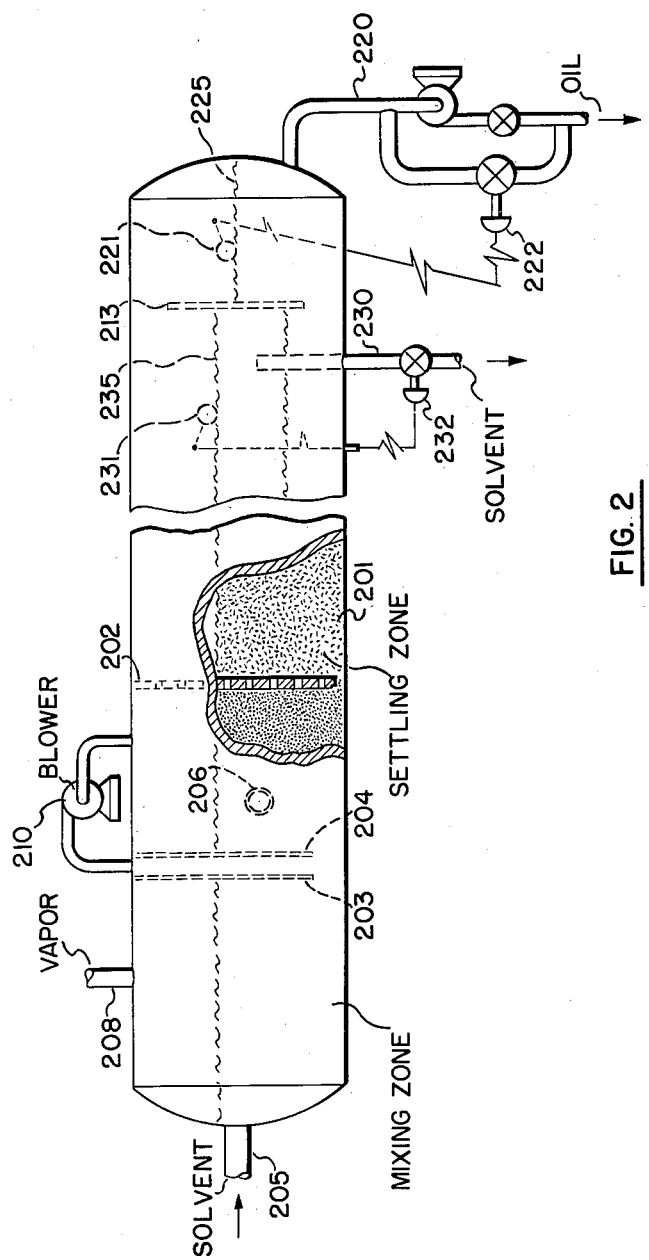

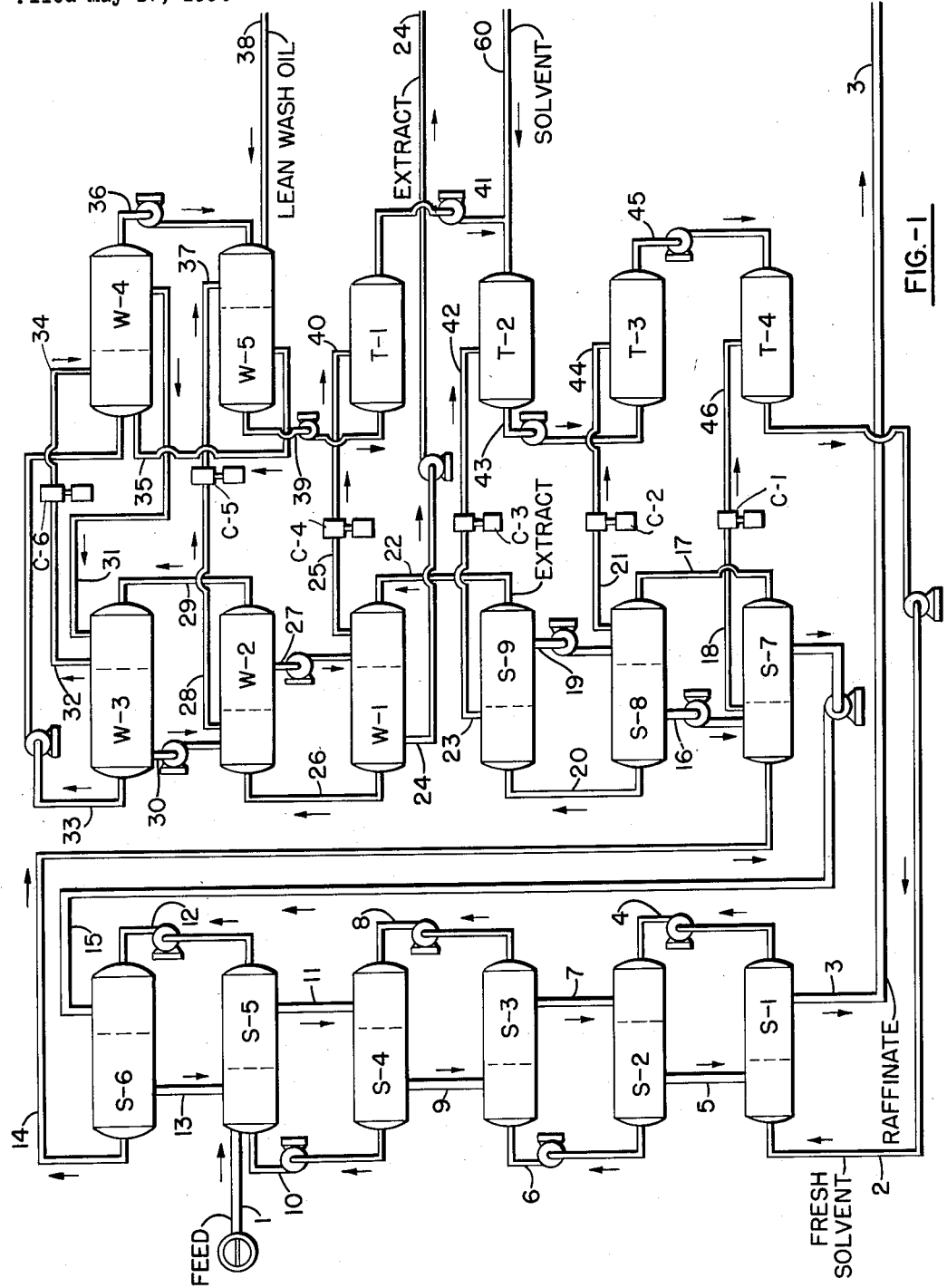

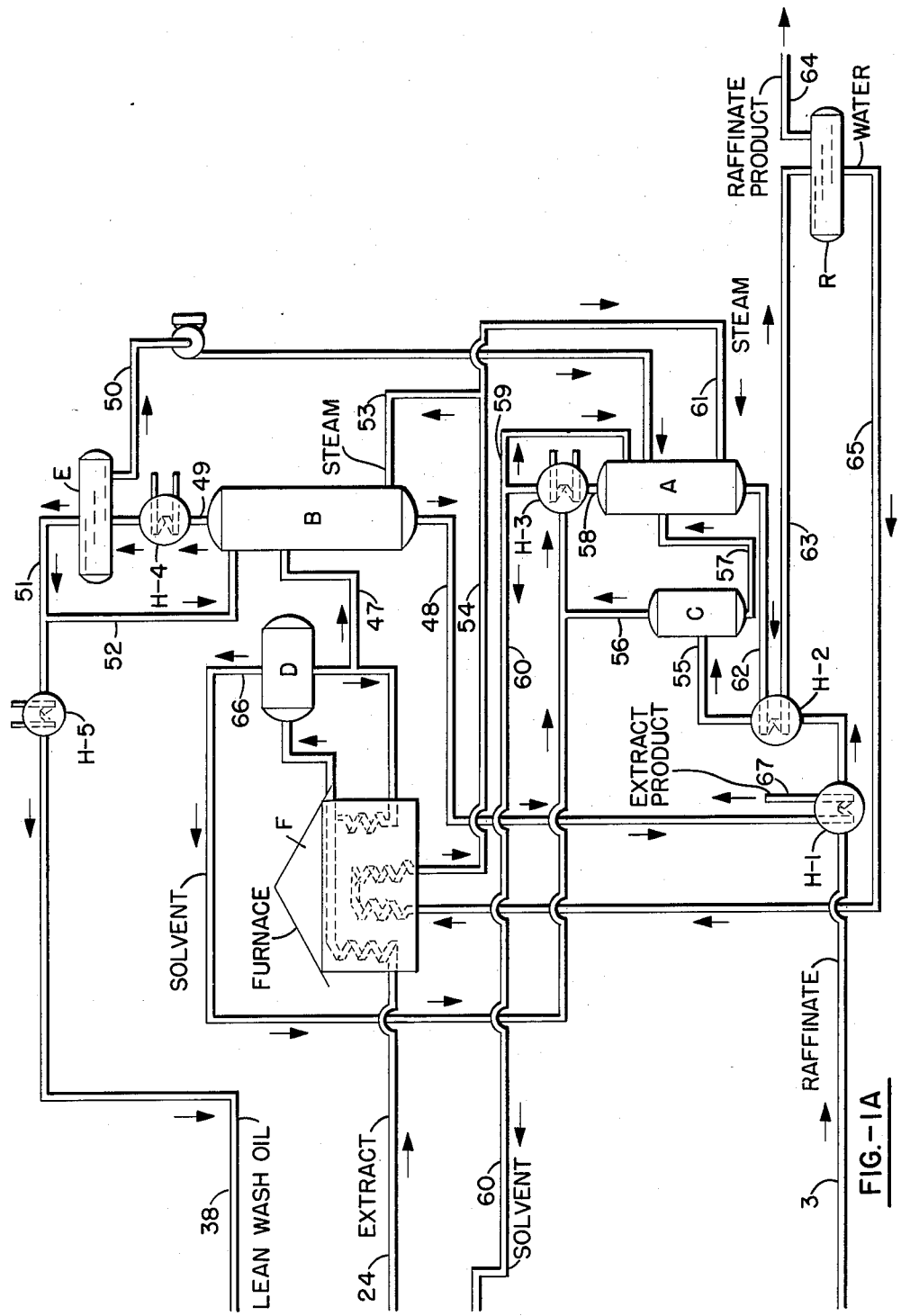

Dec. 27, 1955    M. R. FENSKE    2,728,708
SOLVENT RECOVERY

Filed May 17, 1954    3 Sheets-Sheet 3

MERREL R. FENSKE  INVENTOR
BY  Henry Berk  ATTORNEY

United States Patent Office 2,728,708
Patented Dec. 27, 1955

2,728,708

SOLVENT RECOVERY

Merrell R. Fenske, State College, Pa., assignor to Esso Research and Engineering Company, a corporation of Delaware Application May 17, 1954, Serial No. 430,235

6 Claims. (Cl. 196—13)

This invention relates to a solvent recovery process, particularly to a solvent recovery process employing stepwise auto-refrigeration. More especially it relates to the recovery of a hydrocarbon product and a volatile solvent such as liquid ammonia from extract phases obtained in the liquid extraction of aromatic-containing hydrocarbon feeds such as naphthas, gas oils or lube oils.

Liquid solvent extraction has been used extensively for hydrocarbon separations, and liquid ammonia solvents in particular have been shown to possess important operating advantages over other conventional solvents such as phenol or furfural. Notably, due to the low density and low viscosity of liquid ammonia, the use of ammonia solvents in liquid extractions results in a rapid settling of the phases. Another advantage is the versatility of the ammonia solvents; by using the proper combination of ammonia plus one or more modifiers such as methylamine and water, any petroleum fraction containing hydrocarbons of four or more carbon atoms can be successfully extracted at temperatures between about 70° and 120° F. However, for some separations ammonia is not so selective as other solvents. Therefore, a higher solvent treat may be needed with ammonia solvents to effect the same separations. This relatively high solvent treat requirement, and the resulting cost of recovering the relatively large amount of solvent, has somewhat offset the intrinsic advantages of ammonia extraction. This problem has been attacked before, and one of the cheapest solutions previously proposed appears to be based on the auto-refrigeration principle as described and claimed in copending application Serial No. 202,254, filed December 22, 1950. However, even that solution requires a considerable amount of work in the compressor to regenerate or purify the solvent. Also, there is a considerable heat exchange involved.

It is the object of the present invention to improve the economic aspects of ammonia extraction. A more specific object is to devise a cheaper solvent recovery operation which will permit economical use of higher solvent treats and thus extend the types and sharpness of separations which can be obtained with ammonia solvents. A still more specific object is to devise a solvent recovery method which employs auto-refrigeration to cool the solvent, but in doing so requires only relatively little compression work and a minimum of heat exchange surface. These and other objects, as well as the nature and operation of the invention, will become more clearly apparent from the subsequent description and attached drawings.

In the drawings:

Fig. 1 represents a schematic flow plan of an embodiment of the invention as applied specifically to the extraction of a catalytic cycle stock; and Fig. 2 represents a more detailed view of a mixing-settling unit suitable for use in the present process.

In accordance with the essence of this invention the solvent recovery or purification is based on stage-wise auto-refrigeration of the extract stream, that is, self-evaporation of the solvent contained therein so as to reduce its temperature by a total of about 50 to 200° F. The total temperature drop in this solvent cooling operation is divided into two to eight stages, e. g. six stages. In this manner a temperature drop of about 10 to 50° F., e. g. 20° F., is obtained in each stage and results in precipitating a major or at least a substantial portion of the extracted hydrocarbons from the solvent. In a preferred embodiment the refrigerated solvent may also be further purified by scrubbing at low temperature with a hydrocarbon wash oil which desirably has a boiling range such that the wash oil and the hydrocarbons extracted thereby can be readily separated by simple distillation.

The purified auto-refrigerated solvent is then reheated to extraction temperature by auto-condensation which is also divided into several stages having temperature increments of substantially or approximately the same size as the corresponding auto-refrigeration zones. While not essential, usually it is also more convenient that the number of heating zones equal the number of cooling zones. To effect the heating the solvent vapors withdrawn from the several cooling stages are compressed so that they can be self-condensed by direct contact with the solvent in the appropriate heating stages. The degree of compression or pressure ratio required for this may be about 1.3/1 to 4/1, preferably about 1.5/1 to 2.5/1, since the compressor is only required to provide enough work so the solvent can be condensed at a temperature about 20° F. higher than that at which the vapors were generated. This stepwise arrangement reduces the horsepower required for compression, as compared with a single stage arrangement. Of more importance, the use of low compression ratios enables rotary or centrifugal compressors to be employed. Because of their high speed and simpler construction they occupy less space, and are simpler to service and maintain than piston compressors; they can be directly connected to steam turbines or electric motors without reducing gears. The stepwise cooling arrangement is also necessary because the degree of cooling can be better controlled to provide for the optimum solubility characteristics in the extractor. Also, since self-evaporation and self-condensation are used in the cooling and heating zones, respectively, there is no need for expensive shell-and-tube type exchangers.

The invention is applicable to the separation of a wide variety of hydrocarbon streams. For instance, it can be used in connection with the separation of a catalytically cracked cycle oil wherein the extraction separates the feed into an essentially non-aromatic gas oil portion suitable for recracking and a solvent extract rich in valuable aromatics. The invention can be similarly used in connection with the separation of aromatics and highly polar compounds from naphtha or lube oil cuts. Finally, the invention is applicable to the isolation of individual aromatic compounds such as durene, naphthalene, and the like from suitable refinery streams such as virgin or cracked naphthas.

The wash oil may be a naphthenic or paraffinic hydrocarbon which boils at least 50° F. apart from the boiling range of the extracted hydrocarbons, that is, at least about 50° F. above the end point of the extracted hydrocarbons, or at least about 50 to 100° F. below their initial boiling point. Thus in the case of a typical lube oil extract, the wash oil may be a naphtha, or light gas oil whereas in the case of a naphtha extract the wash oil may be a higher boiling gas oil or light lube oil, and in the case of heavy cycle gas oil extraction the wash oil may be a suitable naphtha, or petroleum fraction boiling in the range of 150° to 350° F.

Solvents to which the invention is applicable may contain ammonia in admixture with certain other low molecular weight compounds which modify the solvent power of the solvent in the desired manner. The amount of modifying agent in the solvent may vary widely and will depend on operating conditions as well as the particular feed stock being treated. In general the solvent mixture may comprise about 30 to 95 percent of ammonia and 70 to 5 percent of one or more modifying agents which may be chosen from a relatively large group. Any substance which will increase or decrease the solvent power of ammonia without reacting in the system may be used. Specific examples of antisolvents, or substances which decrease the solvent power of ammonia toward aromatic hydrocarbons, include water, ethylene glycol, ethylene diamine, formamide, and low melting paraffinic hydrocarbons in the C-6 to C-16 range. On the other hand, suitable modifiers which increase the solvent power of ammonia include the several methylamines, ethylamines, aniline, pyridine, methanol, and the lower alcohols and ethers. Solvents consisting essentially of about 30 to 90 percent ammonia and 70 to 10 percent monomethylamine have been found particularly effective for purposes of the present invention. The amount of modifier is usually controlled so that from about 10 to 30 weight percent solubility is secured at the feed point, depending on the type of separation desired.

The extraction is normally carried out at temperatures which may range between about 40 to 150° F. and at pressures sufficient to keep the solvent liquefied, for instance, at about 100 to 400 p. s. i. g. depending on the temperature and composition of the solvent. Of course, different temperatures are maintained in different portions of the process. For instance, it is frequently feasible to maintain a constant temperature in the stripping sections of the extraction stage while maintaining decreasing temperatures in the consecutive enriching sections of the extraction stage so as to maintain the solubility reasonably constant therein. Decreasing temperatures are then maintained in the solvent washing sections of the solvent recovery stage, the temperature increments of this stage being approximately the same as the temperature drops in the corresponding enriching sections.

The solvent-to-oil ratio may range from about 0.5 to 5 parts of solvent per part of hydrocarbon feed being extracted. High solvent treats are economical in the process of the present invention since solvent recovery is effected without evaporating the bulk of the solvent. The number of stripping and enriching stages will again depend on operating conditions, type of feed, composition of solvent, cleanness of separation desired and so on. Generally, however, about 3 to 10 stripping stages and 2 to 10 enriching stages will result in a satisfactory extraction operation.

For a better understanding of the invention a specific example will now be described.

It will be understood that throughout this specification and appended claims all ratios and percentages are stated on a weight basis unless otherwise indicated.

EXAMPLE

In this example 5000 barrels per day of a catalytic cycle stock having a gravity of 17.6° API, boiling between about 550° F. and 800° F. at atmospheric pressure and containing 44 percent aromatics is separated into an extract and a raffinate containing 90 and 10 percent aromatics, respectively. This separation requires that 42.5 percent of the feed be taken as extract product and the other 57.5 percent as raffinate. The aromatics in the extract amount to 87 percent of those present in the feed while the non-aromatics in the raffinate amount to 92 percent of those in the feed. The solubility at the raffinate end of the extractor is fixed at 10 percent. The solubility is permitted to increase to 25 percent at the feed plate and maintained at that value to the top enriching stage. By reducing the solubility on the top enriching stage to 16 percent, the solvent leaving the extractor carries out only the desired proportion of extract product and thus the need for external pump-back reflux is eliminated. These solubilities of 25% and 16% are typical of one type of operation. Other solubilities can be employed and these are usually in the range of 10 to 30%. Instead of decreasing the solubility, as just mentioned, in the enriching section, it can be maintained constant, or even allowed to increase. In this case, the oil reflux phase comprises a portion of the extract hydrocarbons that is returned, or pumped back, to the top or last enriching stage in the extractor. This reflux serves to wash, or contact counter-currently the ascending solvent phase, between the point where the feed is introduced to the extractor and the point where the solvent phase is withdrawn.

The above solubilities together with a solvent-to-oil ratio of 3/1 give a reflux ratio (O/P) of approximately 1/1 in the enriching section. The symbol "O" denotes the amount of extract oil returned to the extractor as reflux or oil overflow through the enriching section while "P" denotes the amount of extract oil taken from the extractor as product. Both amounts are in the same flow and time units since the reflux ratio is dimensionless. The desired separation can be carried out under these conditions with from about four to eight theoretical stages. The solvent selected for the separation contains 35 percent monomethylamine and 65 percent ammonia. Such a solvent gives the desired solubilities when the temperature in the stripping section is held at 160° F. and the temperature in the enriching section is progressively reduced to 100° F. In this instance no water is in the solvent and none is added to get solubility control, since the gradual reduction in temperature serves the latter purpose. However, water could be present in the solvent in which case the methylamine content would be increased. Also anti-solvents can be used to offset in part the temperature reduction to attain solubility control in the enriching section of the extractor.

A flow diagram of the process is presented in Figure 1. The approximate compositions, flow rates, temperatures, and pressures of the various streams involved are summarized in Table I wherein the numerals of the streams are keyed to said Figure 1. The extractor stages and the washing stages are separate mixer-settlers. Several of the stages operate at different temperatures and under their own respective vapor pressures. This will be shown later. The flows are conventional for a mixer-settler installation, that is, the flow is concurrent through each mixer and settler but countercurrent between stages. Details of a particularly effective internal construction of the mixer-settlers will be given later with reference to Figure 2.

An extractor with nine stages was chosen for the actual operation. The feed is introduced into the middle stage, leaving four stripping stages ahead of and four enriching stages after the feed stage.

Referring to Figure 1, the cycle oil feed enters stage S-5 as stream 1. The oil phase thence passes consecutively through the stripping stages S-4 to S-1 where it leaves the extractor as a solvent-containing raffinate in stream 3. Fresh solvent enters the first stripping stage S-1 as stream 2 and flows in series through the stages, leaving the feed stage S-5 as stream 12. All of the stripping stages, the feed stage, as well as the first enriching stage S-6 are at 160° F., but the temperature is decreased successively 20° F. in each of the remaining enriching stages S-7 to S-9. This 20° F. temperature drop is brought about by evaporating about four percent of the solvent respectively present in each stage. The solvent extract phase leaves the extractor as stream 22.

Table I
KEY TO FLOW PLAN FOR EXTRACTION OF CATALYTIC CYCLE STOCK

| | Wt. Percent Oil | Wt. Percent Solvent | Wt. Percent Aromatics in Oil | Wt. Percent Amine in Solvent | Temperature, °F. | Pressure, p. s. i. a. | Flow, 1,000 Lbs. Per Hour | | | | |
|---|---|---|---|---|---|---|---|---|---|---|---|
| | | | | | | | Solvent | Oil | Wash Oil | Water | Total |
| 1. Oil Feed | 100 | 0 | 44 | | 160 | 425 | 0 | 66.6 | 0 | 0 | 66.6 |
| 2. Solvent Feed | 0 | 100 | | 35 | 160 | 425 | 199.8 | 1.0 | 10.5 | 0 | 211.3 |
| 3. Raffinate | 83 | 17 | 10 | | 160 | 425 | 7.8 | 38.3 | 0 | 0 | 46.1 |
| 4. Solvent Phase | 10 | 90 | | 35 | 160 | 425 | 204.3 | 22.9 | 10.5 | 0 | 237.7 |
| 5. Oil Phase | 83 | 17 | | | 160 | 425 | 12.3 | 60.2 | 0 | 0 | 72.5 |
| 6. Solvent Phase | 15 | 85 | | 35 | 160 | 425 | 205.1 | 36.6 | 10.5 | 0 | 252.2 |
| 7. Oil Phase | 83 | 17 | | | 160 | 425 | 15.1 | 73.9 | 0 | 0 | 89.0 |
| 8. Solvent Phase | 20 | 80 | | 35 | 160 | 425 | 208.4 | 52.3 | 10.5 | 0 | 271.2 |
| 9. Oil Phase | 83 | 17 | | | 160 | 425 | 18.4 | 89.6 | 0 | 0 | 108.0 |
| 10. Solvent Phase | 25 | 75 | | 35 | 160 | 425 | 214.2 | 71.5 | 10.5 | 0 | 296.2 |
| 11. Oil Phase | 83 | 17 | | | 160 | 425 | 22.2 | 108.8 | 0 | 0 | 131.0 |
| 12. Solvent Phase | 25 | 75 | | 35 | 160 | 425 | 199.6 | 66.6 | 10.5 | 0 | 276.7 |
| 13. Oil Phase | 83 | 17 | | | 160 | 425 | 7.6 | 37.3 | 0 | 0 | 44.9 |
| 14. Solvent Phase | 25 | 75 | | 35 | 160 | 425 | 199.6 | 66.6 | 10.5 | 0 | 276.7 |
| 15. Oil Phase | 83 | 17 | | | 140 | 325 | 7.6 | 37.3 | 0 | 0 | 44.9 |
| 16. Oil Phase | 83 | 17 | | | 120 | 245 | 6.8 | 33.5 | 0 | 0 | 41.3 |
| 17. Solvent Phase | 25 | 75 | | 36 | 140 | 325 | 188.2 | 62.8 | 10.5 | 0 | 261.5 |
| 18. Solvent Vapor | 0 | 100 | | 17 | 140 | 325 | 10.6 | 0 | 0 | 0 | 10.6 |
| 19. Oil Phase | 83 | 17 | | | 100 | 180 | 6.1 | 30.0 | 0 | 0 | 36.1 |
| 20. Solvent Phase | 25 | 75 | | 37 | 120 | 245 | 177.9 | 59.3 | 10.5 | 0 | 247.7 |
| 21. Solvent Vapor | 0 | 100 | | 18 | 120 | 245 | 9.6 | 0 | 0 | 0 | 9.6 |
| 22. Solvent Phase | 16 | 84 | 90 | 38 | 100 | 180 | 162.2 | 29.3 | 10.5 | 0 | 202.0 |
| 23. Solvent Vapor | 0 | 100 | | 19 | 100 | 180 | 9.6 | 0 | 0 | 0 | 9.6 |
| 24. Wash Oil Phase | | | | | 80 | 125 | 17.4 | 28.3 | 70.5 | 0 | 116.2 |
| 25. Solvent Vapor | 0 | 100 | | 19 | 80 | 125 | 8.1 | 0 | 0 | 0 | 8.1 |
| 26. Solvent Phase | | | | 39 | 80 | 125 | 152.9 | 22.6 | 9.8 | 0 | 185.3 |
| 27. Wash Oil Phase | | | | | 60 | 90 | 16.2 | 21.6 | 69.8 | 0 | 106.6 |
| 28. Solvent Vapor | 0 | 100 | | 20 | 60 | 90 | 7.3 | 0 | 0 | 0 | 7.3 |
| 29. Solvent Phase | | | | 40 | 60 | 90 | 143.4 | 11.0 | 9.2 | 0 | 163.6 |
| 30. Wash Oil Phase | | | | | 40 | 60 | 14.0 | 10.0 | 69.2 | 0 | 93.2 |
| 31. Wash Oil Phase | | | | | 60 | 90 | 12.8 | 3.0 | 68.7 | 0 | 84.5 |
| 32. Solvent Vapor | 0 | 100 | | 21 | 40 | 60 | 6.3 | 0 | 0 | 0 | 6.3 |
| 33. Solvent Phase | | | | 41 | 40 | 60 | 135.9 | 4.0 | 8.7 | 0 | 148.6 |
| 34. Solvent Vapor | 0 | 100 | | 21 | 60 | 90 | 6.3 | 0 | 0 | 0 | 6.3 |
| 35. Wash Oil Phase | | | | | 80 | 125 | 12.3 | 0.8 | 69.1 | 0 | 72.4 |
| 36. Solvent Phase | | | | 40 | 60 | 90 | 141.7 | 1.8 | 9.1 | 0 | 152.6 |
| 37. Solvent Vapor | 0 | 100 | | 20 | 80 | 125 | 7.3 | 0 | 0 | 0 | 7.3 |
| 38. Wash Oil | | | | | 80 | 125 | 0 | 0 | 70.5 | 0 | 70.5 |
| 39. Solvent Phase | | | | 39 | 80 | 125 | 136.7 | 1.0 | 10.5 | 0 | 148.2 |
| 40. Solvent Vapor | 0 | 100 | | 19 | 100 | 180 | 8.1 | 0 | 0 | 0 | 8.1 |
| 41. Solvent Phase | | | | 38 | 100 | 180 | 144.8 | 1.0 | 10.5 | 0 | 156.3 |
| 42. Solvent Vapor | 0 | 100 | | 19 | 120 | 245 | 9.6 | 0 | 0 | 0 | 9.6 |
| 43. Solvent Phase | | | | 37 | 120 | 245 | 179.6 | 1.0 | 10.5 | 0 | 189.1 |
| 44. Solvent Vapor | 0 | 100 | | 18 | 140 | 325 | 9.6 | 0 | 0 | 0 | 9.6 |
| 45. Solvent Phase | | | | 36 | 140 | 325 | 189.2 | 1.0 | 10.5 | 0 | 200.7 |
| 46. Solvent Vapor | 0 | 100 | | 17 | 160 | 425 | 10.6 | 0 | 0 | 0 | 10.6 |
| 47. Wash Oil Phase | | | | | 600 | | 2.8 | 28.3 | 70.5 | 0 | 101.6 |
| 48. Extract Product | 100 | 0 | 90 | | 320 | 15 | 0 | 28.3 | 0 | 0 | 28.3 |
| 49. Wash Oil Vapor and Steam | | | | | 320 | 15 | 2.8 | 0 | 77.5 | 5.0 | 85.3 |
| 50. Water and Solvent | | | | | 150 | 15 | 2.8 | 0 | 0 | 5.0 | 7.8 |
| 51. Wash Oil | 0 | 0 | | | 150 | 15 | 0 | 0 | 77.5 | 0 | 77.5 |
| 52. Wash Oil Reflux | 0 | 0 | | | 150 | 15 | 0 | 0 | 7.0 | 0 | 7.0 |
| 53. Steam | 0 | 0 | | | 400 | 250 | 0 | 0 | 0 | 5.0 | 5.0 |
| 54. Steam | 0 | 0 | | | 400 | 250 | 0 | 0 | 0 | 9.6 | 9.6 |
| 55. Hot Raffinate | 83 | 17 | 10 | | | 250 | 7.8 | 38.3 | 0 | 0 | 46.1 |
| 56. Solvent Vapor | 0 | 100 | | | 120 | 250 | 6.6 | 0 | 0 | 0 | 6.6 |
| 57. Flashed Raffinate | 97 | 3 | 10 | | 350 | 250 | 1.2 | 38.3 | 0 | 0 | 39.5 |
| 58. Solvent Vapor | 0 | 100 | | 35 | 120 | 250 | 4.8 | 0 | 0 | 0 | 4.8 |
| 59. Reflux Solvent | 0 | 100 | | 35 | 120 | 250 | 0.8 | 0 | 0 | 0 | 0.8 |
| 60. Liquid Solvent | 0 | 100 | | 35 | 120 | 250 | 25.2 | 0 | 0 | 0 | 25.2 |
| 61. Steam | 0 | 0 | | | 400 | 250 | 0 | 0 | 0 | 4.6 | 4.6 |
| 62. Raffinate and Water | 100 | 0 | 10 | | 400 | 250 | 0 | 38.3 | 0 | 9.6 | 47.9 |
| 63. Raffinate and Water | 100 | 0 | 10 | | 245 | 250 | 0 | 38.3 | 0 | 9.6 | 47.9 |
| 64. Raffinate Product | 100 | 0 | 10 | | 245 | 250 | 0 | 38.3 | 0 | 0 | 38.3 |
| 65. Water | | | | | 245 | 250 | 0 | 0 | 0 | 9.6 | 9.6 |
| 66. Solvent Vapor | 0 | 100 | | | 120 | 250 | 14.6 | 0 | 0 | 0 | 14.6 |
| 67. Extract Product | 100 | 0 | 90 | | 200 | 15 | 0 | 28.3 | 0 | 0 | 28.3 |
| 68. Raffinate | 83 | 17 | 10 | | 220 | | 7.8 | 38.3 | 0 | 0 | 46.1 |

After leaving the extractor the extract is countercurrently scrubbed by a wash oil in five successive scrubbing stages W-1 to W-5. The wash oil in the present case is a virgin naphtha fraction low in aromatics and olefins and has a 300° to 350° F. boiling range. This wash oil enters the last stage W-5 of the scrubber as stream 24, also at 80° F. In between, however, stages W-2 and W-4 operate at 60° F. and stage W-3 at 40° F. Here again a temperature decrease of 20° F. per stage is brought about by evaporation of about four percent of the solvent flowing. The low-temperature scrubbing is carried out to obtain a better K value, that is, a greater ratio of aromatics concentration in the oil phase to aromatics concentration in the solvent phase. Conservatively valued, K may range from about 2 at 80° F. to 3 at 60° F. and 4 at 40° F. As shown in Table I, the five scrubbing stages reduce the aromatic content of the extract solvent from sixteen percent in stream 22 to less than one percent in stream 39 when using a 1/3 ratio of wash oil to extractor solvent. Of course, if higher K values are found to exist in any specific system used, either the number of scrubbing stages or the wash oil-to-solvent ratio may be reduced accordingly. Temperatures substantially higher than 80° F. are impractical in the scrubbing section of the specific system described because the wash oil becomes completely miscible in this particular solvent at about 110° F.

The purified solvent leaves scrubbing stage W–5 as stream 39 and then passes through four consecutive tanks T–1 through T–4 in which it is heated from 80° to 160° F. The heating is obtained by condensing the solvent which had been previously vaporized to provide cooling in auto-refrigerated stages W–1 and S–9, S–8 and S–7. It will be observed that the solvent evaporated to produce a given 20° F. temperature drop is condensed to heat the same 20° F. interval. That is, the solvent vapor evaporated to cool enriching stage S–7 from 160° to 140° F. is condensed to reheat the purified solvent in tank T–4 from 140° to 160° F. The two steps are substantially in thermal balance since the heat of evaporation at 160° F. is somewhat less than the heat of condensation at 140° F. In this manner each of the compressors C–1 through C–6 only has to compress from one saturation pressure to a saturation pressure corresponding to a temperature 20° F. higher. By virtue of this feature, the total work input of the present process is low although there are six compressors. Specifically, where auto-refrigeration of the type described in aforementioned application Serial No. 202,254, required a work input of 500 theoretical horsepower and a heat exchanger having more than 10,000 square feet of heat transfer area to effect the necessary cooling, the present invention requires only 360 theoretical horsepower and no heat exchangers to purify the same kind and amount of solvent to a greater extent than in the aforementioned auto-refrigeration process. Moreover, the requirement of the prior process for 20,000 pounds per hour of steam to effect this solvent recovery, is entirely eliminated here. Cooling water requirements are also less.

It is because of this use of solvent as an auto-refrigerant in one portion of the process and as an autocalorific in another portion that each stage operates under its own vapor pressure. Naturally, the cooling-heating cycle just described is not exactly in balance because of the heat content of the oil stream and because of the imperfect efficiency of the compressors. However, this imbalance can be readily compensated by small adjustments of the temperatures of the stages, i. e., the temperature increases or decreases need not be made the same over each stage, or by heating or cooling stream 2 to bring it to the desired temperature for entry into stage S–1. This is readily accomplished by a heat exchanger (not shown) in stream 2 wherein cooling water or steam is used to attain the required solvent inlet temperature.

In the specific example contemplated the purified solvent leaving scrubbing stage W–5 contains about seven percent wash oil. When it leaves heating tank T–4 at this purity, it is ready for pumping back to and re-use in the multi-stage extractor S–1 through S–9. It is to be pointed out also that the foregoing discussion treats the process as if all of the wash oil remained entirely in the solvent whereas in reality some of the wash oil leaves the extractor system with the raffinate phase in stream 3. However, the amount of such wash oil in the raffinate is small and does not affect significantly the magnitude of any of the streams since the wash oil is more soluble in the solvent than the feed stock being treated. This wash oil together with solvent in the raffinate is distilled overhead in raffinate stripping column A, and returned to the extraction process via line 60.

The raffinate stream 3 is heated in exchangers H–1 and H–2 and solvent is flashed therefrom at 250 p. s. i. a. and 350° F. in drum C. After flashing, the liquid raffinate oil is fed through line 57 to distillation column A where remaining solvent is stripped from the oil by open steam introduced through line 61. Column A may have a still temperature of about 400° F. The solvent vapor passes from flash drum C through line 56 to exchanger H–3 which serves as the condenser for column A. A portion of the condensed solvent is returned to column A through line 59 to serve as reflux while the remainder is passed through line 60 to join the main solvent stream.

The distillate stream 60 from column A is pure solvent plus any wash oil in line 3 that accompanied the raffinate, and the bottoms stream 62 contains a mixture of oil and water. The heat in the bottoms stream is used to preheat the raffinate in aforementioned exchanger H–2. From the exchanger the bottoms at about 250° F. flow through line 63 to a raffinate separator R. The separated oil layer is removed as raffinate product stream 64 and the water layer is returned through line 65 to furnace F where steam is produced for use in raffinate tower A and later described extract tower B.

The oil stream 24 from scrubbing stage W–1 contains wash oil and extract product. This steam is also passed through furnace F and flashed at 250 p. s. i. a. in drum D. Enough heat is added by the furnace to produce pure solvent vapor and liquid at 600° F. The solvent vapor stream 66 may be combined with the solvent vapor stripped from the raffinate for condensation in aforementioned exchanger H–3 and eventual return to the extractor. The hot liquid from flash drum D is re-flashed at atmospheric pressure in tower B. To insure complete removal of the wash oil from the extract product, steam is also introduced via line 53 to tower B. The pure extract is removed from tower B through line 48 at about 320° F. and its heat content may be utilized for preheating the raffinate stream 3 in aforementioned exchanger H–1 before the extract product is finally recovered from the process as stream 67. The vapor mixture leaving tower B through line 49 at about 320° F. contains wash oil, water, and some solvent. This mixture is completely condensed in exchanger H–4 and passed to separator E. The lower layer from the separator contains the solvent and water, and may be taken to column A for solvent recovery. The corresponding portion of water is eventually used to generate the stripping steam injected through line 53 into column B. The upper layer formed in separator E consists essentially of wash oil at about 150° F. This oil layer is then returned to the scrubbing cycle in stage W–5 through lines 51 and 38, preferably after cooling to about 80° F. in exchanger H–5. To insure a complete separation of the wash oil and extract, a small amount of the oil layer from separator E is returned through line 52 to tower B as reflux.

Instead of applying the present process to the extraction of cycle oil or heavier stocks, it can also be used with only minor modifications for extracting relatively light fractions such as naphtha. For instance, when a catalytic or thermally cracked naphtha is being extracted, a light gas oil fraction could be used as a convenient wash oil. This being the case, the only difference from the process shown in Figure 1 would be that in such naphtha extraction the extract product would form the distillate and the wash oil would form the bottoms in tower B. Since the wash oil need not be vaporized, and the extract product is only a portion of the naphtha feed, the furnace heat requirement is nominal. Of course, for the extraction of naphtha fractions, pure ammonia solvent and a 120° to 0° F. temperature gradient might be more satisfactory than the 35% amine solvent and 160° to 40° F. gradient used for the cycle stock. Optimum operation of course depends in every case upon the proper choice of solvent composition and temperature level of the operation, as will be readily understood by those skilled in the art. The principal factor in making these selections is that of solubility in the solvent. At least three points in the extractor should be tested for solubility. These are the raffinate outlet, the extract outlet, and the feed inlet. Solvent compositions and temperatures should be selected so that the solubility of oil in the solvent lies between about 10 and 30 percent for these three points.

For the extraction of 5000 barrels per day of catalytic cycle stock under the conditions described earlier herein the mixer-settler units may be about 4 feet in diameter and arranged in any spatial arrangement, since one or both of the phases may be moved from stage to stage by pumps. A convenient way is to construct three or four stages in series in one continuous pipe of four-foot diameter.

A specific construction of the internals of a suitable auto-refrigerating mixer-settler tank is shown in Figure 2. The tank shown consists of a shell 201 which is divided into a ten-foot mixing zone and a twenty-foot settling zone. The two zones are separated by a perforated plate baffle 202 to aid the settling.

The mixing zone is divided by two solid plates 203 and 204 located about five feet from the light phase inlet end 205. These plates extend from the top almost to the bottom of shell 201 and have serrated bottoms. The plates may be spaced about six inches apart so as to form a small chamber for the passage of vapors. Mixing is accomplished by blowing vapor from the right hand section into the space between the two plates. A hydraulically driven blower 210 is preferably used for this purpose. Being hydraulically driven, the blower can be completely enclosed and can be mounted inside the tank if desired. Furthermore, instead of having an individual blower for each stage, for all those stages operating at the same temperature and pressure it is possible to use a manifold suction and exhaust on a larger capacity blower. The vapor passes to the bottom of the plates and bubbles up through the liquid on the downstream side to the right of the plates. This produces excellent mixing since the heavy phase introduced through its inlet 206 is dropping down through the light phase while the rising vapor agitates the light phase. Other mixing arrangements may be used instead of bubbling vapor through the liquid.

Another solid baffle 213 is placed in the settling section about one foot from the exit of the tank. Baffle 213 may extend from a level about six inches below the top of shell 201 to a level about six inches above the bottom of the shell. This baffle permits the heavy phase to flow below it to the heavy phase exit line 220 but prevents the light phase from entering the heavy phase exit zone. The light phase exit is a pipe 230 upstream of baffle 213 which enters the tank vertically from the bottom or side to a point slightly below the liquid surface. The exit streams 220 and 230 can be controlled by float type controllers 221 and 231, respectively, which operate between a liquid and vapor interface and activate valves 222 and 232 in such a manner that levels 225 and 235 are maintained in the desired position.

The mixer-settler shown in Figure 2 is representative of extraction tanks S–7 to S–9 and scrubbing tanks W–1 to W–3 from which solvent is being evaporated for purposes of refrigeration. The suction side of the vapor compressors (shown in Figure 1) is tied to opening 208 on the top left of shell 201 (shown in Figure 2). The calorific mixer-settlers W–4 and W–5 which receive condensable compressed vapor are the same as that in Figure 2 except that they have no vapor exit 208 and the incoming vapors enter the vapor passage between plates 203 and 204 concurrent with the vapor supplied by hydraulic blower 210. In fact, the hydroulic blower may be entirely omitted on tanks W–4 and W–5 because in many cases the volume of vapor entering is approximately equal to the volume of the light phase or solvent flowing through tanks and good intermingling is thus achieved. Extraction mixers S–1 through S–6 are also identical with the one shown in Figure 2 except that there is no vapor exit 208. The last four tanks T–1 to T–4 shown in Figure 1 act as condensers for the compressed solvent vapor, the condensation of which serves to reheat the liquid solvent to extraction temperature. They can be considerably smaller than the other tanks of the system and require no internals except a vapor entrance line extending below the liquid surface.

Having described the general nature of the invention and illustrated it in terms of specific examples, it will be understood that the patentable scope hereof is particularly pointed out in the appended claims.

The claims:

1. In a process for recovering a vaporizable liquid solvent from a relatively warm liquid solvent extract containing said solvent saturated with extracted liquid material, the improvement which comprises passing said liquid extract in sequence through a first and at least one other of a plurality of independent contacting zones, evaporating a portion of said liquid solvent in each said contacting zones to cool the liquid therein about 10 to 50° F. by auto-refrigeration and to precipitate a portion of the extracted material from the solvent extract, removing said precipitated material from each of said contacting zones and passing it to the next preceding contacting zone in a countercurrent relation between the zones with respect to said solvent extract, removing relatively purified precipitated material from one of said contacting zones, passing relatively purified cold liquid solvent from the last of said plurality of contacting zones through a first and at least one other of a plurality of independent direct condensation zones, said condensation zones being substantially the same in number as the aforesaid auto-refrigerated contacting zones, removing evaporated solvent from the last of said auto-refrigerated contacting zones, compressing said removed solvent vapor from its saturation pressure to a saturation pressure corresponding to a temperature which is higher than the temperature of the said last contacting zone by a temperature interval approximately equal to the temperature drop in said contacting zones, mixing said compressed solvent vapor with said relatively cold liquid solvent in said first condensation zone, thereby condensing said vapor and heating said liquid solvent, similarly removing and compressing solvent vapor from each of the other auto-refrigerated contacting zones and introducing said compressed vapor into the corresponding condensation zone in such a manner that the solvent evaporated in the first of said contacting zones is condensed in the last of said condensation zones, and removing reheated liquid solvent from the last of said condensation zones.

2. A process according to claim 1 wherein the solvent comprises liquid ammonia and the extracted material is a normally liquid hydrocarbon.

3. A process according to claim 1 wherein the extraction temperature is between about 160° and 100° F., the solvent is a liquid mixture of ammonia and methylamine, and the extracted material is an aromatic gas oil fraction.

4. A process according to claim 1 wherein the extraction temperature is between about 120° and 60° F., the solvent comprises a major proportion of liquid ammonia, and the extracted material is a cracked naphtha fraction.

5. In combination with a process for separating a liquid mixture of feed hydrocarbons into a relatively aromatic extract and a relatively non-aromatic raffinate wherein said mixed hydrocarbons are countercurrently contacted with a liquid ammonia solvent in an extraction system comprising a plurality of independent auto-refrigerated extraction zones operating at progressively lower temperatures, each of said auto-refrigerated zones being cooled to a temperature lower by an interval of about 10 to 50° F. than the preceding zone by evaporating a minor portion of the solvent therein and wherein a raffinate hydrocarbon stream is withdrawn from an extraction zone operating at a relatively high temperature, the improvement which comprises removing a crude solvent extract stream from the last of said extraction zones, passing it successively through a plurality of at least three independent scrubbing zones in countercurrent flow with a hydrocarbon wash oil which has a boiling range substantially different from the boiling range of the feed hydrocarbons, each of said scrubbing zones being maintained at a temperature different by an interval of about 10 to 50° F. from the temperature of its adjacent scrubbing zones, the intermediate scrubbing zone being the coldest, auto-refrigerating said intermediate scrubbing zone and each of the preceding scrubbing zones to the required degree by evaporating therein a minor portion of the solvent, withdrawing streams of the evaporated solvent separately from each of the aforesaid auto-refrigerated zones at their saturation pressure and temperature, compressing each of said withdrawn vapor streams to a saturation pressure corresponding to a temperature higher by an interval of 10 to 50° F. than its first saturation temperature, progressively heating the liquid solvent in each of the scrubbing zones which succeed said intermediate scrubbing zone by direct condensation therein of the respective compressed solvent vapor stream originally withdrawn from a zone maintained at a temperature which is substantially the same as the temperature of the liquid solvent to be heated and being introduced into the respective scrubbing zone, withdrawing purified liquid ammonia solvent containing less than about 10% of hydrocarbon from the last of said scrubbing zones, withdrawing a mixture containing said wash oil and an aromatic hydrocarbon extract from the first of said scrubbing zones, and separating substantially pure extract product from the last named mixture.

6. A process according to claim 5 wherein the extraction system comprises at least three extraction zones maintained at progressively lower temperature, wherein there are at least three progressively cooler scrubbing zones followed by at least two progressively warmer scrubbing zones, and wherein the purified solvent withdrawn from the last of said scrubbing zones is reheated substantially to extraction temperature by passage through a plurality of successive heating tanks, the heating being accomplished by withdrawing separate streams of solvent vapor from each of the aforesaid auto-refrigerated extraction zones, compressing said withdrawn streams to a saturation pressure corresponding to the desired condensation temperature, and condensing the compressed vapor streams directly in the liquid solvent in the respective heating zones, the reheated purified solvent being returned to the extraction system.

References Cited in the file of this patent

UNITED STATES PATENTS

| | | |
|---|---|---|
| 2,114,524 | Egli | Apr. 19, 1938 |
| 2,146,147 | Keith et al. | Feb. 7, 1939 |
| 2,201,821 | Andrews et al. | May 21, 1940 |
| 2,214,678 | Raigorodsky | Sept. 10, 1940 |
| 2,396,299 | Sweeney et al. | Mar. 12, 1946 |
| 2,616,912 | Dickinson | Nov. 4, 1952 |